Dec. 10, 1968     M. D. CHATTAWAY ET AL     3,415,111
APPARATUS FOR TESTING TUBES OR RODS BY ULTRASONICS
Filed Sept. 13, 1965     3 Sheets-Sheet 1

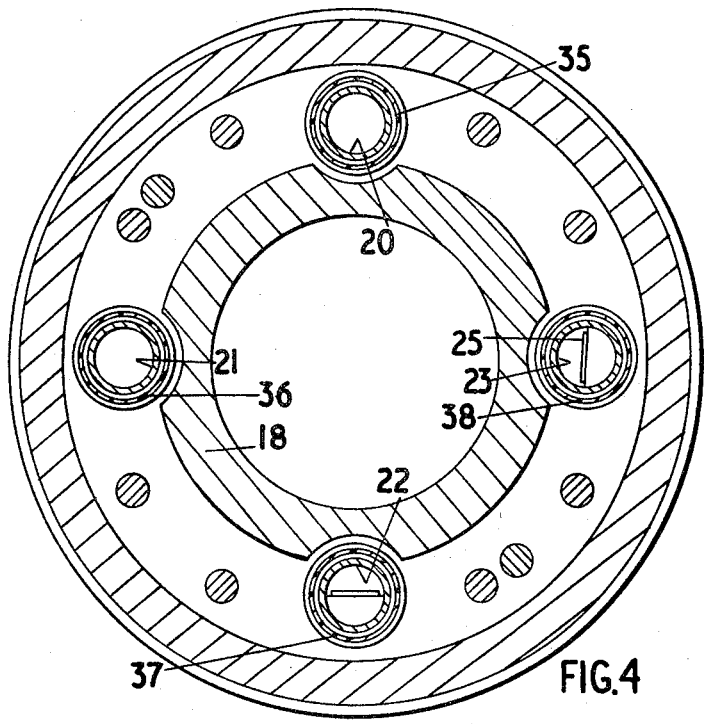
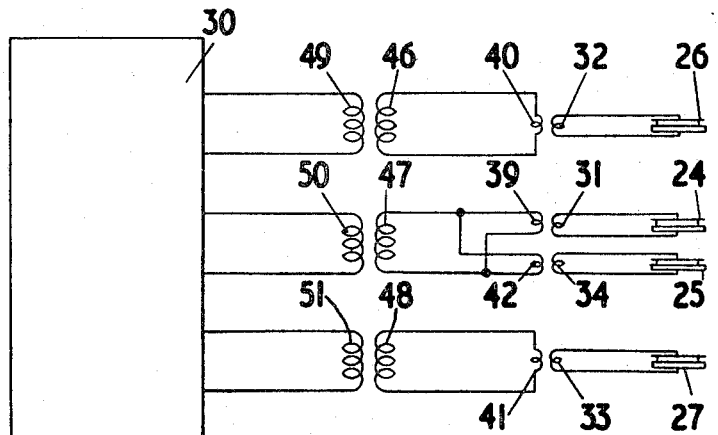

United States Patent Office 3,415,111
Patented Dec. 10, 1968

3,415,111
APPARATUS FOR TESTING TUBES OR RODS
BY ULTRASONICS
Maurice David Chattaway, Walsall, Staffs, and Kenneth Edward Bowen, Norton, Stourbridge, England, assignors, by mesne assignments, to S.T.D. Services Limited, Edgbaston, England, a British company
Filed Sept. 13, 1965, Ser. No. 486,702
Claims priority, application Great Britain, Sept. 14, 1964, 37,457/64
8 Claims. (Cl. 73—67.8)

ABSTRACT OF THE DISCLOSURE

An ultrasonic testing equipment makes use of a head having a passage therethrough for the reception of the elongated test piece, there being a plurality of elongated cylindrical carriers extending through bores in the head parallel to the passage. Each carrier supports a crystal transducer element in a recess therein. Each carrier is provided with a coupling winding which is magnetically coupled when the carrier is in position in the head with a winding on an insert in the bore. Means are provided for simultaneously angularly adjusting the carrier members.

---

Figure 1:
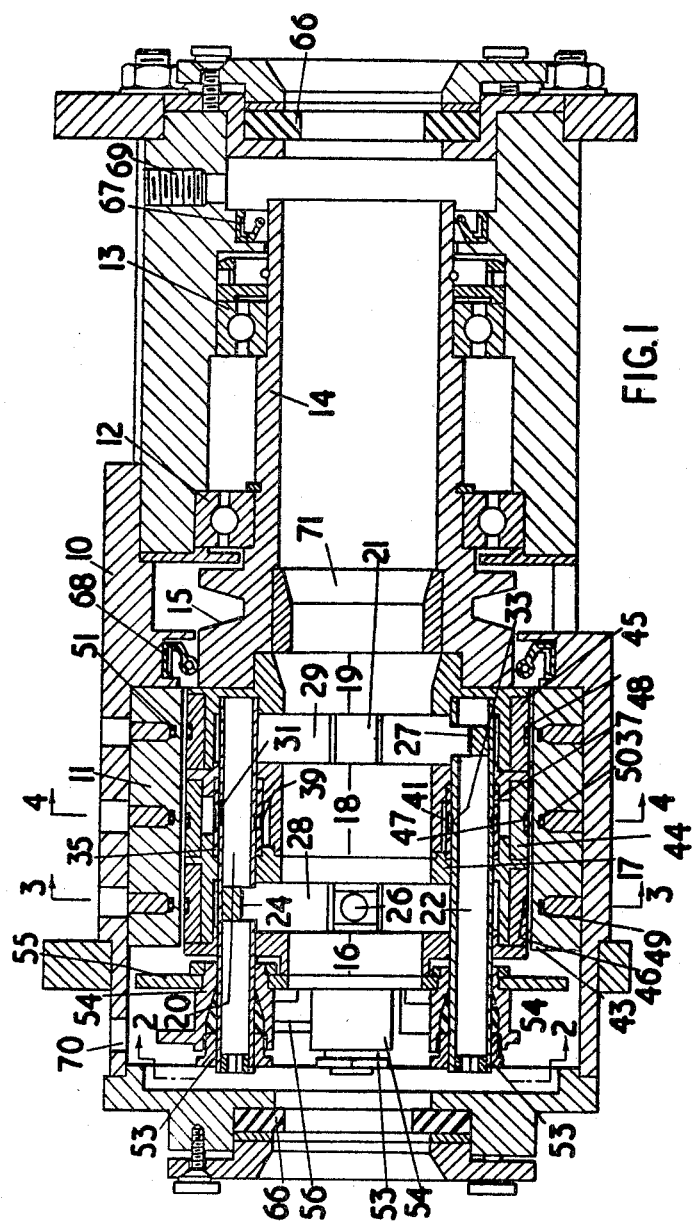

This invention relates to apparatus for testing tubes or rods by ultrasonics, of the kind comprising a stator, a rotor rotatably carried within the stator and having therethrough a passage through which a tube or rod to be tested can be passed axially, at least one transducer-element carried by the rotor and arranged to transmit and/or receive ultrasonic energy into or from a tube or rod under test, at least one coil on the stator for connection to a signal generating and/or detecting device and at least one coil on the rotor connected to the transducer element and magnetically coupled to the stator coil.

Where a single transducer element is employed it acts as a transceiver and the signal generating and detecting device includes switch means which alternately connect the stator coil to the signal generating part and the detecting part of said device.

Alternatively two transducer elements may be employed in which case there will be two rotor coils and two stator coils. One stator coil is connected in use to a signal generating device and the associated transducer element then acts as a transmitter. The other stator coil is connected to a detecting device and the associated transducer element acts as a receiver. In some applications it has been found advantageous to employ more than one pair of transducer elements, since faults are sometimes more easily detected by waves travelling in one direction around a body than waves travelling in the opposite direction. In such an arrangement there may be a plurality of transmitting transducer elements all connected to a single rotor coil and plurality of receiving transducer elements connected respectively to a plurality of independent rotor coils.

In any such arrangement it is necessary to arrange, in use, that the ultrasonic waves directed onto the surface of the tube or rod under test should be travelling in a direction at a specified angle to the surface of the tube or rod at the point of entry. This has led to some difficulty in arranging the transducer or transducers for testing tubes and rods of differing diameters. With one known arrangement, in which transducer elements are fixed to the rotor with their axes lying in non-diametral planes it has been found that a given rotor is only useful for tubes with diameters falling within a range of one-sixteenth of an inch.

It is accordingly one object of the invention to provide, in apparatus of the kind specified, an arrangement for mounting the or each transducer element for adjusting in the rotor.

In accordance with the invention said transducer element is carried on a carrier member mounted in a bore in the rotor and angularly movable relative thereto about an axis having at least a component parallel with the rotor axis.

In this way the preferred direction in which waves are transmitted by the transducer if it is a transmitter or a transceiver or the preferred direction of reception of the transducer if it is a receiver or a transceiver can be adjusted so that the transducer axis can be arranged to intersect the surface of any tube or rod, with a diameter lying within a relatively wide range, at the requisite angle.

Preferably the transducer is connected to a winding on the carrier member, an insert mounted in the bore and surrounding the carrier member having a further winding magnetically coupled to the carrier member winding and connected to the rotor coil.

Figure 2:
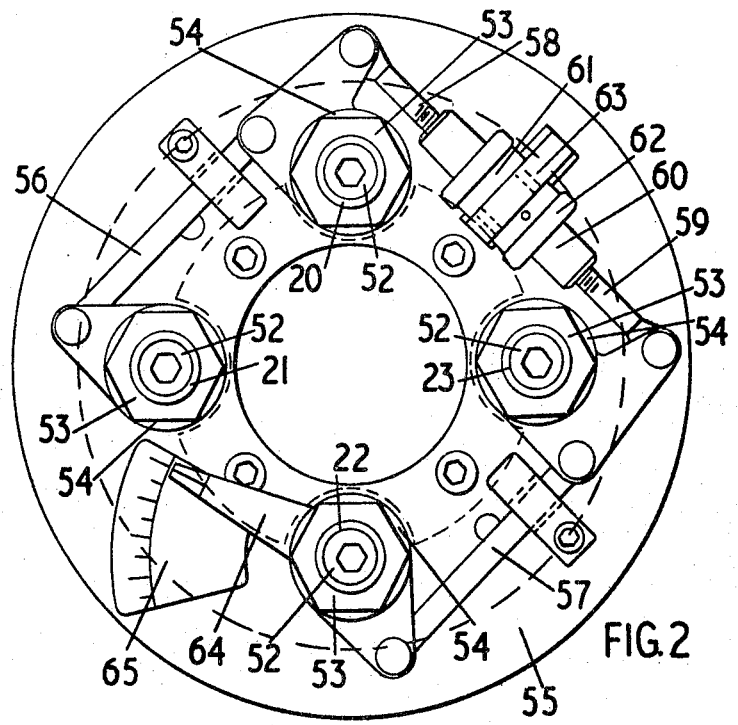
Figure 3:
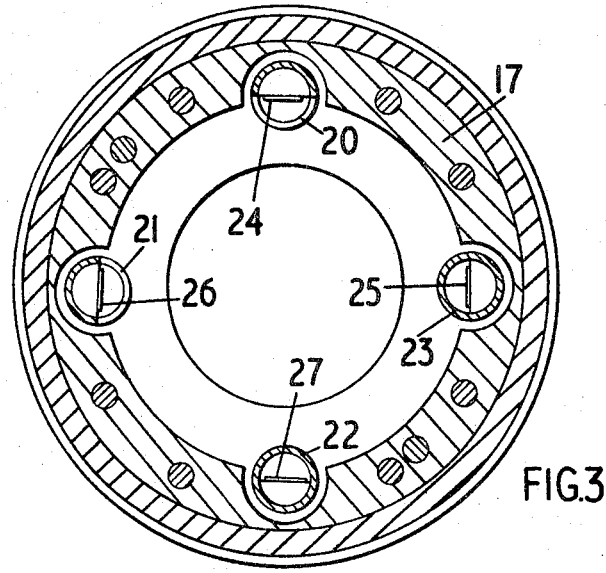

Reference will now be made to the accompanying drawings in which:

FIGURE 1 is a longitudinal section through an example of apparatus in accordance with the invention and including a stator and a rotor;

FIGURES 2, 3 and 4 are enlarged views taken respectively on lines 2—2, 3—3 and 4—4 in FIGURE 1, but showing the rotor only; and FIGURE 5 is a diagrammatic view showing the electrical arrangement of the apparatus.

Referring to the drawings, the apparatus shown includes a casing 10 in which a stator 11, formed of a suitable insulating material, is mounted. Rotatably carried by bearings 12, 13 within the casing 10 is a rotor assembly 14. A pulley 15 forms a part of the rotor assembly 14 and is driven, in use, by a co-acting V-belt drive (not shown).

The rotor assembly also includes a composite block made up of ring members 16, 17, 18 and 19. Formed through this block are four equally spaced parallel bores in which four carrier members 20, 21, 22 and 23 are mounted. Each carrier member is in the form of a length of tube and each carries a transducer element in the form of crystal. The transducer elements 24, 25 carried respectively by the carrier 20, 23 form transmitters for ultrasonic waves, whilst the transducer elements 26, 27 carried by the carrier members 21, 22 respectively form receivers. As shown the transducer elements 24, 26 are arranged in one transverse plane, whilst the transducer elements 25, 27 are arranged in a spaced plane. Adjacent these two planes the composite rotor block has internal annular grooves 28, 29 formed respectively between the ring members 16 and 17 and between the ring members 18 and 19.

Each carrier member is angularly movable about its own axis, so that the direction of the axis of the associated crystal is angularly adjustable. It is to be noted, however, that at the position where the crystal is mounted, the tubular carrier member is cut away to enable the crystal to be set on the tube axis. This prevents any bodily movement of the crystal from accompanying rotary motion thereof.

Connection of the transducer elements to the ultrasonic generator and receiver 30 with which the apparatus is used is accomplished in each case by a two stage magnetic coupling arrangement. Each carrier member is formed intermediate the two grooves 28, 29 with an external groove. In the grooves of the members 20, 21, 22 and 23 windings 31, 32, 33 and 34 are carried. Located between ring parts 17 and 18 are four inserts 35, 36, 37, 38, in the form of insulating spools surrounding the carrier members 20, 21, 22, and 23 respectively. The inserts carry windings 39, 40, 41 and 42 respectively overlying and magnetically coupled to windings 31, 32, 33 and 34.

The outer surface of the rotor assembly 14 where it is contained within stator 11 is constituted by three rings 43, 44 and 45 of insulating material. Three coils 46, 47 and 48 are mounted respectively in grooves in the external surfaces of these rings. Three coils 49, 50 and 51 are mounted in overlying positions on the stator 11 and are magnetically coupled to coils 46, 47 and 48 respectively. Coil 46 is connected to winding 40, coil 47 to windings 39 and 42 and coils 48 to winding 41.

Adjustment of the tubular carrier members can be effected both independently and simultaneously. As shown each carrier member is provided in its end with a socket element 52 formed with an hexagonal hole to receive a suitable turning tool. Each carrier member is clamped by a nut 53 to a collar 54 pivotable on a plate 55 attached to ring members 16 and, as shown in FIGURE 2, the collars 54 are interconnected by linkage means. A link 56 interconnects the collars 54 of carrier members 20 and 21, whilst a link 57 interconnects the collars 54 of carrier members 22 and 23. Connecting the collars 54 of carrier members 20 and 23 is a link of variable length comprising a pair of screws 58, 59 of opposite hand pivoted respectively to the collars 54, a screw threaded sleeve 60 engaging screw 58, 59 and knurled grips 61, 62 arranged on opposite sides of a lug 63 on plate 55 and attached to the sleeve 60. The collar 54 of carrier member 22 also has a pointer 64 co-acting with a scale 65 on the plate 55 to indicate the angular displacement of the carrier members from the neutral positions shown.

Individual adjustments of the carrier members can be made by loosening the nuts 53 and turning the carrier members relative to the collars 54. When simultaneous adjustment is required, the knurled grips 61, 62 are turned for example to shorten the length of the variable-length link. This has the effect of turning carrier members 20 and 21 in a clockwise direction as seen in FIGURE 2 and carrier members 22 and 23 in an anti-clockwise direction.

At the ends of casing 10 there are provided a pair of rubber seals 66 which engage a tube as it is passed through the apparatus. Seals 67, 68 are mounted on the casing 10 and engage the rotor assembly 14 to protect the bearings 12, 13 from water which in use is circulated through the casing to act as a medium for the ultrasonic waves. Water enters through an inlet 69 and leaves through an outlet 70. The whole of the space surrounding the composite block and the interiors of the carrier members are filled, in use, with water.

In use the carrier members are adjusted so that the axes of the transducer elements intersect the surface of a tube or rod under test at the appropriate angle. Thus, in the case of a small diameter tube or rod the angle by which the carrier members are displaced from their neutral positions is small, whereas a larger angle is required for a larger diameter test piece. As the casing 10 is traversed along the test piece, or the test piece is driven through the casing, rotor assembly 14 is driven and pulses of ultrasonic A.C. are fed to transducer elements 24, 25 via the coils 50 and 47 and the windings 39, 31 and 42, 34. Ultrasonic waves are thus injected into the test piece via the water medium and a proportion of the energy injected reaches receiving transducers 26, 27. The signals generated are fed back to the detector 30 where indicating or recording instruments are provided. In general terms, flaws in the test piece cause temporary increases in the level of the signals received at one or both of the receiving transducers, so that any such increases indicate flaws, the positions of which can easily be established.

It will be seen that the arrangement described above enables tubes and rods of diameters lying within a considerable range to be tested without substitution of expensive parts of the apparatus. Adjustment of the carrier members is quick and simple. It may, of course, be necessary to change the seals 66 and the guide member 71 for different tube or rod sizes.

The provision of a magnetic coupling between the individual transducer elements and the rotor coils provides a very simple arrangement enabling the carrier members to be removed quite simply for replacement of the transducer elements.

Having thus described our invention what we claim as new and desire to secure by Letters Patent is:

1. Apparatus for the testing of elongated test pieces, such as tubes and rods, for flaws by ultrasonics comprising a head having therethrough a passage through which the test piece is passed axially and a bore parallel to said passage, at least one elongated carrier member received by said bore in the head with its axis parallel to the axis of the passage extending through the head, a crystal transducer element mounted in a recess in said carrier member intermediate the ends thereof, said crystal transducer element being arranged with the axis normal to its active surface being transverse to the axis of the carrier member, said carrier member being rotatable within the bore for selecting the direction of the normal axis of the crystal transducer element, an ultrasonic pulse generating and receiving instrument, and a pair of coupling means respectively on the carrier member and within said bore in the head electrically coupling the crystal transducer element to said ultrasonic pulse generating and receiving instrument.

2. Apparatus as claimed in claim 1 in which said crystal transducer element lies on the axis of the carrier member so that turning of the carrier member does not cause translatory movement of the crystal transducer element.

3. Apparatus as claimed in claim 1 in which the coupling means comprise a winding on the carrier element and a coacting winding on an insert within said bore and surrounding the winding on the carrier member, said windings being magnetically coupled, the winding on the carrier member being electrically connected to the crystal transducer element and the winding on said insert being electrically connected to the ultrasonic pulse generating and receiving instrument.

4. Apparatus as claimed in claim 1 comprising a plurality of said carrier members mounted respectively in a plurality of bores in the head, a plurality of said crystal transducer elements mounted in recesses in said carriers respectively and a plurality of said pairs of coupling means electrically coupling the crystal transducer elements to the pulse generating and receiving instrument.

5. Apparatus as claimed in claim 4 further comprising a plurality of means for angularly adjusting the individual carrier members and means for simultaneously angularly adjusting all the carrier members.

6. Apparatus as claimed in claim 5 further comprising collars on the carrier members respectively, links interconnecting the collars for simultaneous angular displacement and adjustable means connecting one of the collars to the head for turning said collar, the carrier members being individually angularly adjustable relative to the collars.

7. Apparatus as claimed in claim 6 in which there are two pairs of the carrier elements, the collars of the carrier elements of each pair being linked for unison movement, and said adjustable means comprises a link of adjustable length interconnecting the collars of one carrier member of one pair and one carrier member of the other pair so that adjustment of the length of the link causes one pair of carrier members to be turned in one direction and the other pair of carrier members to be turned in the opposite direction.

8. Apparatus as claimed in claim 1 in which said head comprises a rotor mounted for rotary movement within a stator, the coupling means is a winding on the rotor magnetically coupled to a winding on the stator electrically connected to said pulse generating and receiving instrument.

References Cited

UNITED STATES PATENTS

| 3,056,285 | 10/1962 | Gibson et al. | 73—67.8 |
| 3,183,709 | 5/1965 | Rankin et al. | 73—67.9 XR |
| 3,289,468 | 12/1966 | Van der Veer et al. | 73—71.5 |

RICHARD C. QUEISSER, *Primary Examiner.*

J. P. BEAUCHAMP, *Assistant Examiner.*